Aug. 22, 1967  P. C. MALONE  3,336,791
DEVICE FOR INDICATING VAPOR-LIQUID RATIO OF A FLUID
Filed March 25, 1965  2 Sheets-Sheet 1

INVENTOR
PATRICK C. MALONE

BY Claude Funkhouser
ATTORNEY
Richard D. Graver
AGENT

United States Patent Office 3,336,791
Patented Aug. 22, 1967

3,336,791
DEVICE FOR INDICATING VAPOR-LIQUID RATIO OF A FLUID
Patrick C. Malone, 13040 Old Stage Coach Road, Laurel, Md. 20810
Filed Mar. 25, 1965, Ser. No. 442,839
1 Claim. (Cl. 73—19)

ABSTRACT OF THE DISCLOSURE

A device for measuring the ratio of the volume of vapor to the volume of liquid in a continuous stream of flowing fluid having two graduated transparent tubes arranged in parallel with the transverse axis of the stream of flowing fluid and a selector mounted on slides for reciprocation whereby the flow of fluid through one of the tubes may be redirected through the second tube while at the same time a quantity of the flowing fluid in the first tube is trapped to permit continuity of flow of the fluid in the second tube while providing an indication in the first graduated tube of the ratio of the volume of vapor to the volume of liquid.

---

Figure 1:
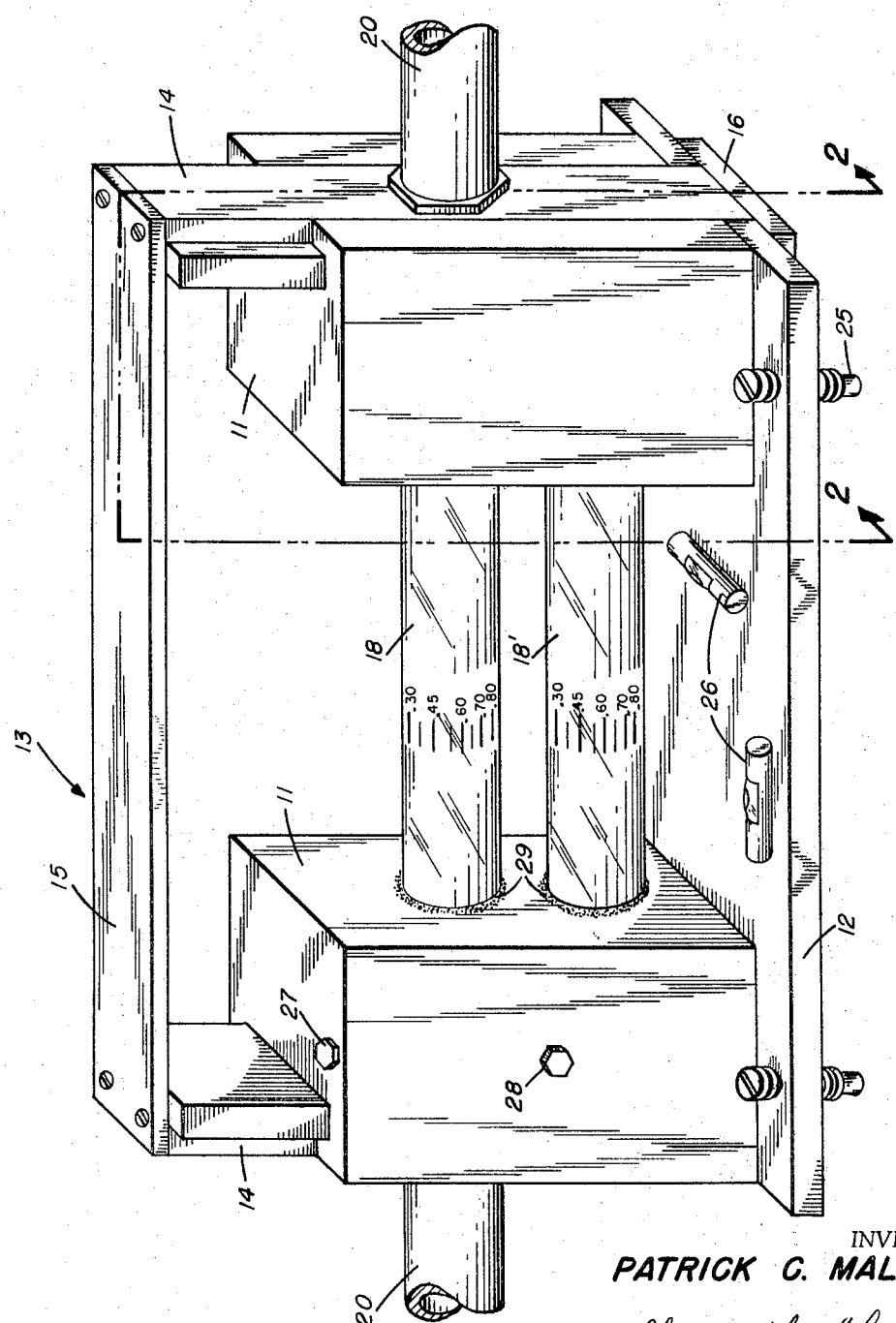

The invention described herein may be manufactured and used by or for the Government of the United States of America for governmental purposes without the payment of any royalties thereon or therefor.

This invention relates generally to measuring equipment, and more particularly to a device for measuring the relative proportions of vapor and liquid in a flowing fluid.

The transition of a fluid from its liquid phase to its vapor phase is dependent upon the ambient conditions of temperature and pressure. The vapor pressure of a fluid is defined as the pressure exerted by the gas of that fluid when it is in equilibrium with the liquid phase. The vapor pressure is a temperature dependent property, and increases with increase in temperature. When the vapor pressure increases to the point that it is equal in magnitude to the ambient atmospheric pressure, the vapor will escape to the atmosphere from the surface of the liquid and the liquid will boil. Similarly, if the atmospheric pressure decreases below the fluid vapor pressure, boiling will result.

The reduction of atmospheric pressure at high altitude creates problems in the operation of aircraft fuel systems. The atmospheric pressure at high altitude may not be sufficiently high to exceed the vapor pressure of the fuel. Furthermore, pressure losses resulting from the flow of fuel from the aircraft fuel tanks to the fuel pump inlet will further reduce the ambient pressure. When the ambient pressure falls below the vapor pressure, bubbles appear in the fuel lines, causing a reduction in pump efficiency and available power from the engine.

An additional problem, known as cavitation, arises from the formation of vapor bubbles within the flowing fuel. These bubbles abruptly collapse as they pass into the high pressure zone of the pump. The resulting flow pattern is inefficient and may produce objectionable noise and vibration. The magnitude of the stresses in the cavitation zone may lead to eventual failure of the boundary material. In view of these problems, it is customary to find included in engine specifications, a requirement that the engine must perform satisfactorily during several hours of sustained operation under cavitation conditions.

An indication of the severity of cavitation is provided by the ratio of vapor to liquid existing in the flowing fluid. This ratio, hereinafter designated as $V/L$, is defined as the volume of vapor divided by the volume of liquid. To obtain the $V/L$ ratio, it has been heretofore necessary to measure the fuel temperature and tank pressure in the fuel tank and the fuel temperature and pressure at the pump inlet, as well as to obtain fuel samples for the determination of specific gravity. These values were then inserted into an empirical formula. The above method was time consuming and often required the interruption of a test.

Accordingly, it is the principal purpose of this invention to provide means for measuring directly the vapor/liquid ratio of a flowing fluid.

It is a further object of this invention to provide simple and reliable means for measuring the vapor/liquid ratio of a flowing fluid.

It is another object of this invention to provide a means for measuring the vapor/liquid ratio of a flowing fluid without interruption of a test.

Figure 2:
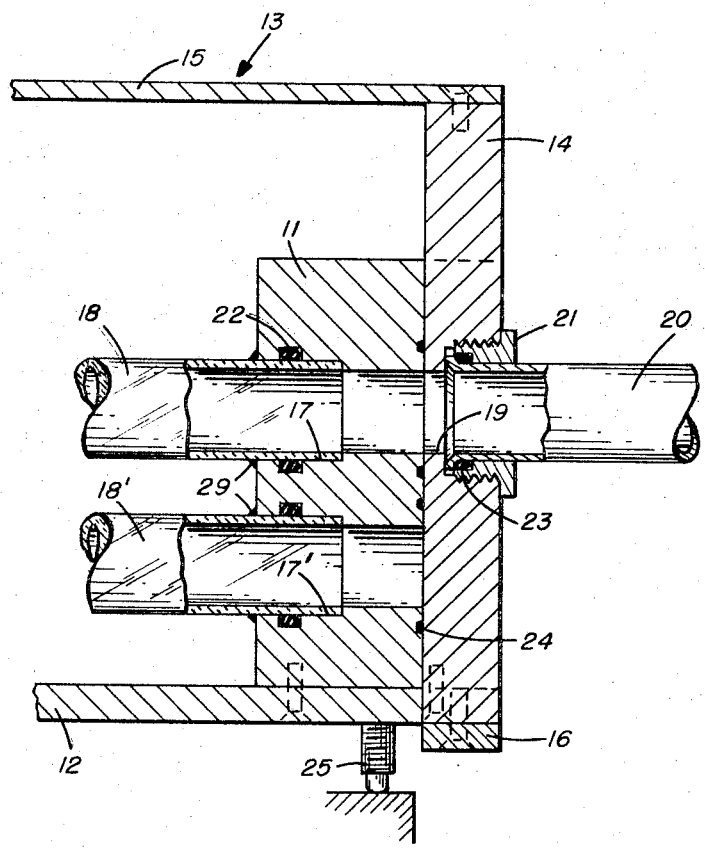

Other objects, advantages and novel features of the invention will become apparent from the following detailed description of the invention when considered in conjunction with the accompanying drawings wherein:

FIG. 1 is a perspective view of the invention; and
FIG. 2 is a fragmentary sectional view taken through the longitudinal axis of the device.

Referring to FIGURE 1 it is seen that two guides 11 are mounted on opposite ends of a base plate 12. Slide assembly 13, comprising two slides 14 and a handle 15, is mounted for reciprocation in guides 11. A stop 16 limits the upward movement of the slide assembly 13, while handle 15 limits the downward movement of the slide assembly.

Referring to FIGURE 2 it is seen that a pair of counterbored holes 17 and 17' pass through each of the guide members 11. Upper hole 17 receives transparent tube 18, while lower hole 17' receives transparent tube 18'. Each of the slides 14 has a hole 19 passing therethrough to receive tubing 20. The end of tubing 20 is flared and is held in place within slide 14 by means of unions 21 which are threadedly connected to slides 14. O-rings 22 and 23 prevent leakage around tubing 18 and 20, respectively. O-rings 24 prevent leakage between the guide 11 and the slide 14.

When slide assembly 13 is in its upper position, as shown in each of the figures, tubes 20 are axially aligned with tube 18. Communication is provided between tubes 18 and 20 by means of aligned bores 17 and 19 in guide 11 and slide 14, respectively. Similarly, when slide assembly 13 is shifted to its lower position, tubing 20 will be aligned with the lower tube 18'. In each of the positions of the slide assembly 13, communication will be provided between tubing 20 and one of the tubes 18 or 18', while both ends of the other tube 18 or 18' will be blocked by slides 14.

Leveling screws 25 and spirit levels 26 are provided to permit leveling of the meter assembly.

Plugs 27 and 28 are placed at the outer opening of two passages (not illustrated) in each of the guides 11, which passages communicate with tubes 18 and 18', respectively. These passages are of small diameter and short length, so that the volume of the passages will be negligible as compared with the volume of tubes 18 and 18'.

To prevent rotation of tubes 18 and 18' after assembly, the joint between the tubes and guides 11 may be coated with cement 29.

To calibrate the tubes, the meter is leveled by means of screws 25, and slide assembly 13 is placed in the upper position as shown in the figures. Fuel at a 110° F. is allowed to flow through the meter for one hour, to bring the temperature of tube 18 up to that of the fuel. At the end of the hour the fuel is drained completely from the meter. Slide assembly 13 is then placed in the lower position to block both ends of tube 18, and plugs 27 are removed. Fuel at 110° F. is then poured from a graduated beaker into one of the passages thus uncovered until the tube 18 is completely full and the fuel level is visible in the unplugged passage. The volume of fuel poured into the meter shall be termed P, which quantity includes both liquid and vapor. Using the formula $$y = \frac{P}{V/L + 1}$$

the quantity P obtained above and an arbitrary value for $V/L$ are inserted in the formula and the volume of liquid $y$ required for that $V/L$ condition is computed. After draining the meter, the volume $y$, thus computed, of fuel at 110° F. is then poured into the meter and the liquid level is marked on the transparent tubing 18. The mark is labeled with the arbitrary value of $V/L$ used in the computation. The process is then repeated using other $V/L$ ratios until the desired degree of calibration is obtained. Then the slide assembly 13 is placed in the upper position, plugs 28 are removed, and the process is repeated for the lower tube 18′.

In operation the meter is connected in series just ahead of the fuel pump under test. For purposes of illustration, the slide assembly 13 is placed in the upper position, it being understood that operation could be initiated from either position. Tube 18 will thus be open at both ends and aligned with tubes 20, while both ends of tube 18′ will be blocked. Plug 28 is removed and tube 18′ is filled with fuel, so as to provide a reservoir to permit uninterrupted flow when slide assembly 13 is switched to the lower position. Plug 28 is then replaced. The test is begun and fuel flows through open tube 18. When it is desired to obtain a measurement of the vapor to liquid ratio of the fuel being used, the slide assembly is rapidly moved to the lower position. This movement traps a volume of fuel that was flowing in tube 18 and simultaneously redirects the fuel through tube 18′. When the trapped fuel in tube 18 has settled, the $V/L$ ratio may then be observed by noting the liquid level adjacent the graduated portion of the tube.

Obviously many modifications and variations of the present invention are possible in the light of the above teachings. It is therefore to be understood that within the scope of the appended claim the invention may be practiced otherwise than as specifically described.

What is claimed is:

A device for indicating the vapor/liquid ratio of a continuous stream of fluid comprising:
  means for connecting the device in series with the stream of fluid flow system to be analyzed;
  a plurality of parallel conduits each parallel to the transverse axis of the continuous stream of flowing fluid and having a transparent graduated portion;
  selector means for establishing a flow path between the fluid flow system and selected ones of said conduits, said selector means and said plurality of conduits providing alternate parallel fluid flow paths directly through the device;
  interrupter means for selectively sealing both ends of selected ones of said conduits, said interrupter means cooperating with said selector means to seal conduits exclusive of the conduits through which said selector means has established a flow path parallel to the transverse axis of the stream of flow;
  whereby the flow of fluid through first preselected ones of said conduits may be redirected by said selector means to second preselected ones of said conduits, and said interrupter means contemporaneously traps a quantity of fluid in said first preselected ones of said conduits, thereby to provide continuity of flow through said device and to permit the vapor/liquid condition of the fluid to be observed adjacent the graduated portion of said first preselected ones of said conduits.

References Cited
UNITED STATES PATENTS

| | | | |
|---|---|---|---|
| 1,347,701 | 7/1920 | McCook | 73—329 |
| 2,085,007 | 6/1937 | Conrath | 73—422 XR |
| 3,150,517 | 9/1964 | Kuffer et al. | 73—422 XR |

DAVID SCHONBERG, *Primary Examiner.*